(No Model.)
W. G. & C. W. G. LITTLE.
APPARATUS FOR RECORDING POWER OF STEAM ENGINES.
No. 546,897. Patented Sept. 24, 1895.
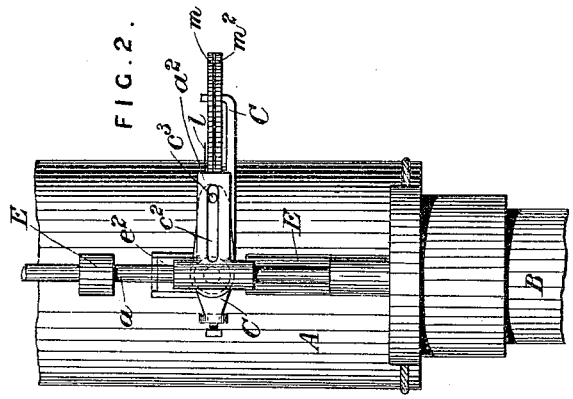
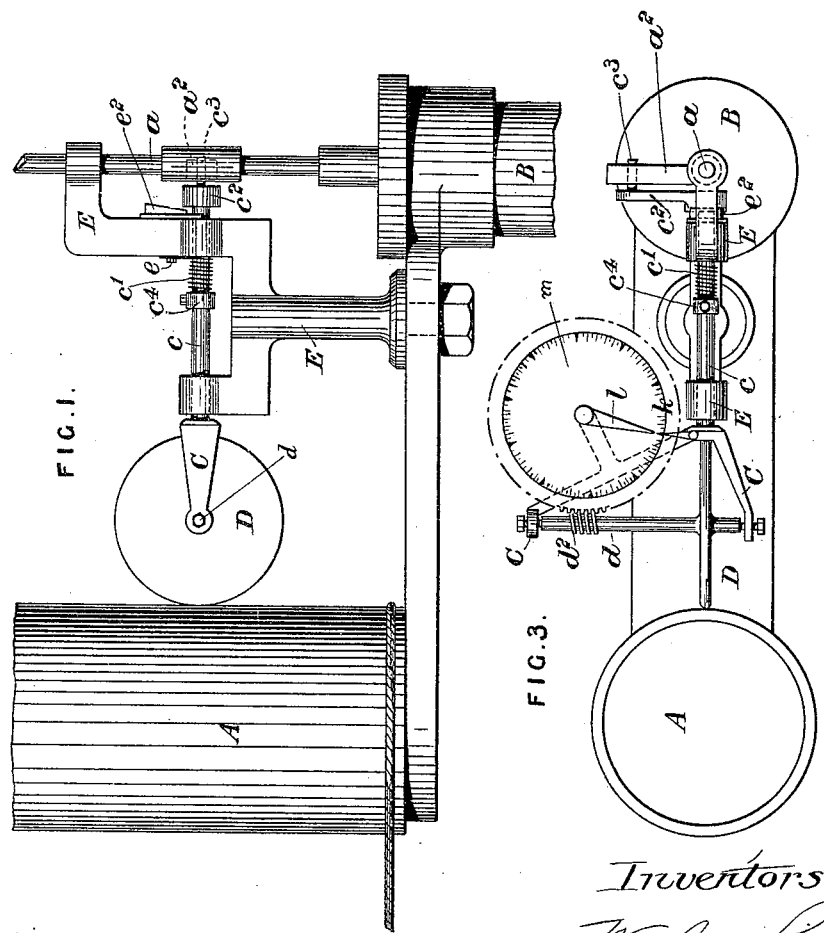
Witnesses,
Inventors:
W. G. Little
C. W. G. Little

UNITED STATES PATENT OFFICE.

WILLIAM G. LITTLE, OF LONDON, AND CHARLES W. G. LITTLE, OF HECKINGTON, ENGLAND.

APPARATUS FOR RECORDING THE POWER OF STEAM-ENGINES.

SPECIFICATION forming part of Letters Patent No. 546,897, dated September 24, 1895.

Application filed May 3, 1895. Serial No. 548,005. (No model.) Patented in Belgium March 16, 1895, No. 114,591.

*To all whom it may concern:*

Be it known that we, WILLIAM GODSON LITTLE, residing at Bexley, London, in the county of Kent, and CHARLES WILLIAM GODSON LITTLE, residing at Heckington, in the county of Lincoln, England, subjects of the Queen of Great Britain, have invented certain Improvements in Apparatus for Indicating or Registering the Power Exerted by Steam or other Motive-Power Engines, (patented by us in Belgium, No. 114,591, March 16, 1895,) of which the following is a specification.

The object of our invention is to provide efficient means whereby the power given out by an engine during any given time is indicated or registered, so that it can be directly ascertained without making a series of diagrams for reference.

According to our invention we employ a surface which is reciprocated or moved by the action of the piston of the engine so that the periphery of a disk or wheel which is mounted in proximity to it comes in contact with a portion which describes a right line during its movement, or which represents a right line, such as a circumferential line on a cylinder if the reciprocating or moving surface be in the form of a cylinder. The periphery of the said disk or wheel is curved or shaped to give a proper bearing on the said surface or cylinder, and the said disk or wheel is pivoted or mounted on a center in a carrier, which is itself pivoted or mounted in bearings in such a way that its axis of rotation is in a line with a diameter of the said disk or wheel. When the reciprocating or moving surface or cylinder is set in motion, the disk or wheel, by reason of its contact therewith, will be caused to rotate upon its axis, and its velocity at any instant will be proportional to the velocity of the reciprocating or moving surface or cylinder at that instant and to the sine of the angle made by the axis of the disk or wheel with the line of motion of the said reciprocating or moving surface or cylinder. This angle we cause to be varied by the changes of pressure in the engine-cylinder; but as the velocity of the disk or wheel is proportional to the sine of the said angle we employ gearing by means of which the sine of the angle made by the axis of the disk with the line of motion of the reciprocating or moving surface or cylinder is always proportional to the pressure in the engine-cylinder and between the limits of zero and ninety degrees. By this means the velocity of the disk is at every instant proportional to the work being done at that instant by the engine, and therefore the number of rotations made by the disk in a given time is proportional to the work done by the engine during that time.

We will describe, with reference to the accompanying drawings, the best means with which we are acquainted for carrying our invention into effect.

Figures 1 and 2 are elevations at right angles to each other, and Fig. 3 is a plan.

B is the pressure-cylinder of the indicator (in communication with the pressure of the engine and provided with a piston and spring like an ordinary indicator-cylinder) with its piston rod $a$ geared or connected, as hereinafter described, with the axis $c$ of the carrier C of the disk or wheel D, the said axis $c$ being carried by the bearings in the standard E, which also serves as a guide for the rod $a$. To the axis $c$ is secured a crank arm or disk $c^2$, the crank-pin $c^3$ of which engages in a slotted arm $a^2$ on the rod $a$ of the piston of the pressure-cylinder B of the indicator, so that as the said rod $a$ moves up and down the crank-pin $c^3$ will travel along the slot in the arm $a^2$, and the necessary motion, varying in degree in the required manner, will thus be imparted to the carrier C and disk or wheel D, the twisting motion imparted to the carrier of the said disk or wheel varying in degree as required as the disk or wheel D approaches the position in which its plane is parallel with the direction of motion of the reciprocating cylinder A, which is that hereinbefore described as the surface or cylinder which is by the action of the engine moved in contact with the said disk or wheel D.

The indicating or registering can be done by a counter or register receiving its motion from the axis $d$ of the disk or wheel D. It is shown as being actuated by a worm $d^2$ on the axle $d$ of the disk or wheel D, the counter consisting in the arrangement shown of two wheels $m\ m^2$, both in gear with the worm $d^2$. The upper wheel is marked $m$, and the pointer $k$, fixed to the carrier C, indicates by a scale on the wheel $m$ the degree of movement of the said wheel. The axis of the lower wheel $m^2$ carries a pointer $l$, which also indicates on a scale on the wheel $m$ the number of rotations made by the wheel $m^2$, as the two wheels have different numbers of teeth—for instance, the wheel $m$ may have one hundred teeth and the lower wheel $m^2$ ninety-nine teeth, so that the one wheel $m^2$ will indicate hundreds of rotations of the other wheel $m$.

The disk or wheel D is forced into contact with the cylinder A by a spring $c'$ on the axis $c$, one end of the said spring pressing against a collar $c^4$ and the opposite end against the standard E, to which it is attached at $e$. It likewise tends to keep the pin $c^3$ pressed on the lower part of the slotted arm $a^2$, so as to avoid backlash. The said disk or wheel D can be held out of contact with the cylinder A by inserting between the boss of the crank $c^2$ and the standard E a wedge $e^2$, fitted to slide in suitable guides on the said standard.

We do not limit ourselves to the arrangement shown for imparting the motion due to the changes of pressure in the engine to the disk or wheel D, as any arrangement which will have the same effect can be used. For example, there may be a gear-wheel secured to the axis on which the carrier C of the disk or wheel turns, the said gear-wheel not being circular, but of somewhat pear-shape or oval form and calculated to give motion in the aforesaid manner, and there would then be a correspondingly-shaped rack on the piston-rod of the cylinder of the indicator to gear with the said wheel, or a pair of chains connected to the piston-rod and to the said wheel may be used.

Having now particularly described and ascertained the nature of the said invention and in what manner the same is to be performed, we declare that what we claim is—

1. In apparatus for indicating, or registering, the power exerted by steam, or other motive power engines, the combination with a surface which is reciprocated or moved as aforesaid by the action of the engine, of a disk, or wheel, with its periphery bearing on the said surface, a crank for altering in the required manner the angular position of the said disk or wheel, relatively to the line of motion of the said surface, a rod operated by the engine, in accordance with the variations of pressure in the engine, and having a pin and slot connection with the said crank, and a counter or register actuated by the said disk or wheel, substantially as hereinbefore described.

2. In apparatus for indicating or registering the power exerted by steam, or other motive power engines, the combination with a surface which is reciprocated or moved as aforesaid by the action of the engine, of a disk or wheel, with its periphery bearing on the said surface and mounted in a carrier turning upon an axis and a crank or lever on the axis of the carrier of the said disk or wheel operated by a piston (working in a cylinder such as B) by means of a pin and slot connection for altering in the required manner as aforesaid the angular position of the said disk, or wheel, relatively to the line of motion of the said surface, and in accordance with the variations of pressure in the engine, and a counter, or register, actuated by the said disk, or wheel, all substantially as hereinbefore described.

In testimony whereof we have signed our names to this specification in the presence of two subscribing witnesses.

W. G. LITTLE.
C. W. G. LITTLE.

Witnesses:
EDWD. GEO. DAVIES,
ED. C. HAMMOND.